Patented Apr. 12, 1949

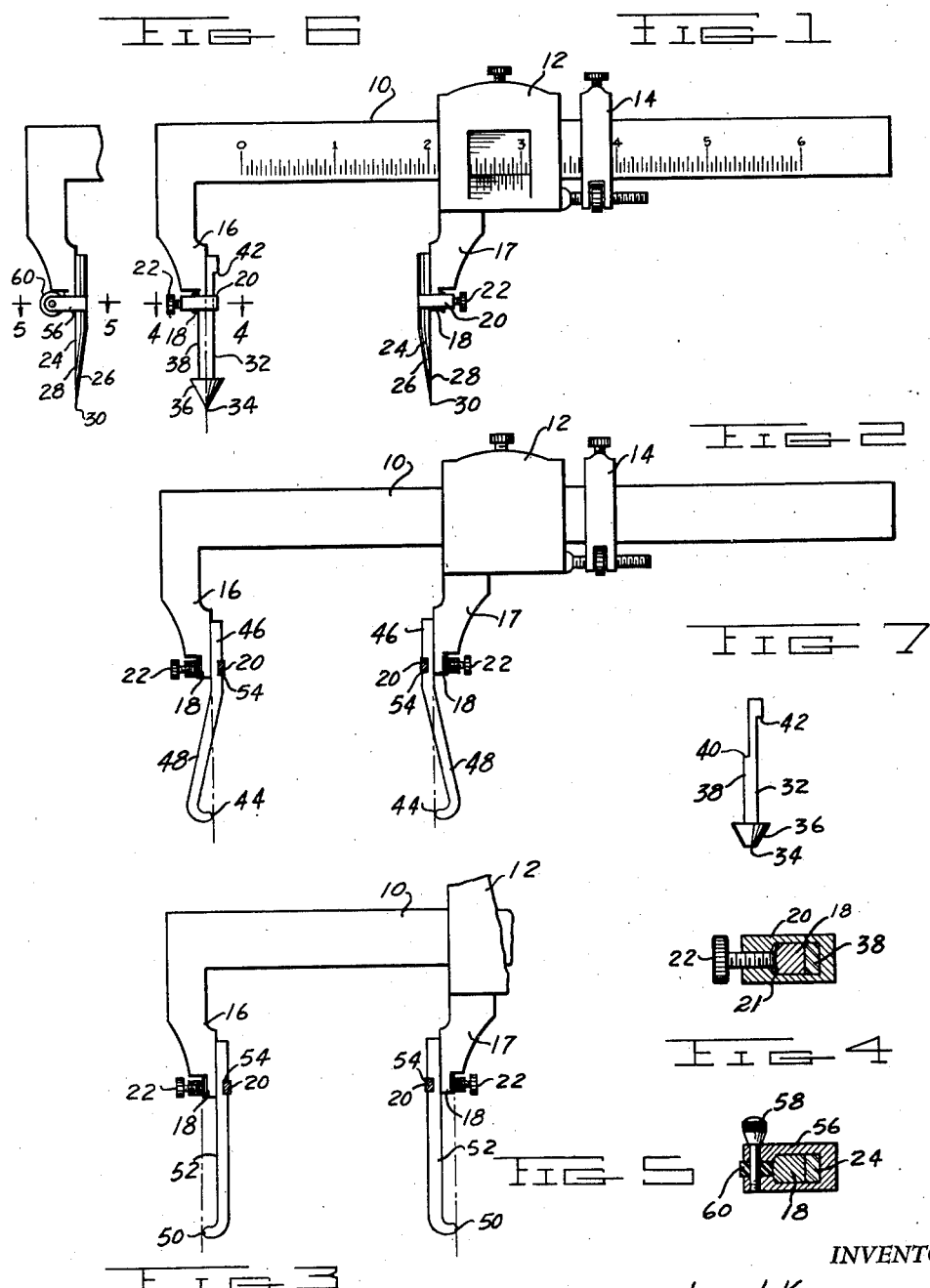

2,467,263

UNITED STATES PATENT OFFICE 2,467,263

STRUCTURE FOR REMOVABLE ATTACHMENT OF DIVIDER AND CALIPER POINTS TO MEASURING JAWS OF MEASURING INSTRUMENTS

John J. Krisanda, East Paterson, N. J.

Application April 8, 1946, Serial No. 660,477

1 Claim. (Cl. 33—143)

This invention relates to a direct reading vernier divider and caliper points and the primary object of the invention is to provide direct reading points that will give the layout man and inspector a direct method of meeting the present day requirements of accuracy needed in the manufacture of interchangeable parts.

These requirements can no longer be met with the old guess method of transferring dimensions from vernier or micrometer to ordinary calipers and then to part or vice versa, trusting to one's sense of feel. Considerable amount of time is spent in performing the old method of operation or in setting up a part to check the same to present day requirements for accuracy, since an ordinary caliper cannot be set with precision.

Another object of the invention is to provide points that are readily changed, are simple in construction, durable in use and efficient in operation.

With the above and other objects in view the invention consists of the novel details of construction, arrangement and combination of parts more fully hereinafter described, claimed and illustrated in the accompanying drawings in which:

Figure 1 is an elevational view of an instrument embodying the invention with a divider point and a conical point attached.

Figure 2 is the same partly in section showing outside measuring points attached.

Figure 3 is the same partly in section and broken away showing inside measuring points attached.

Figure 4 is a sectional view on the line 4—4 of Figure 1.

Figure 5 is a sectional view on the line 5—5 of Figure 6.

Figure 6 is a modified form of attaching the points to the instrument and

Figure 7 is an elevational view of an enlarged V-point.

Referring more in detail to the drawings the reference numeral 10 designates a gauge or instrument having a slide 12 mounted thereon which is controlled by the vernier attachment 14 for accuracy and fine adjustment of the instrument. This invention relates to the positioning of the changeable points in place on the measuring surface of a vernier jaw and the specific manner of securing the points in position.

The vernier jaws 16 and 17 respectively of the instrument 10 are provided with depending nibs 18 which present a vertical surface against which the points are placed and retained thereon by clamps 20 having set screws 22 or clamps 56 having eccentric wheels 60 mounted therein.

The divider points 24 are so designed that the point is on the same plane with the measuring surface of the vernier jaws and may be set or read directly on the outside scale of the vernier to .001 accuracy for equal spacings, chord measurements or scribing diameters. When these points become dull it is only necessary to stone the conical radius 26 until sharp without disturbing the surface 28 or the accuracy of the points 30.

The conical points 32 are for scribing circles or arcs around a hole, the point being so designed that the vertex 34 of the cone 36 is centered and on a direct line with the measuring surface on the vernier jaws and adjustable to depth of hole diameter by means of the stem 38. When placed in a hole the point or vertex 34 forms a seat on center from which arcs and circles may be scribed with the divider point 24 to vernier accuracy and the reading is taken direct on the outside scale on the vernier. The stem 38 is provided with a shoulder 40 which engages the nib 18 and a shoulder 42 which engages the clamp 20 or clamps 56; the shoulders thus limit the upward and downward adjustment of the stem.

The outside measuring points 44 have a straight portion 46 engaging the jaws 16 and 17 and an outwardly inclined portion 48 intermediate the portion 46 and the point 44. Thus the points are designed so that the measuring surface on the points is on a direct line with the measuring surface of the vernier jaws; with this feature the points may be set or read directly on the outside vernier scale to vernier accuracy in measuring slots, reliefs, depths of keyways, undercuts, etc., on outside surfaces. The points are tapered, or inclined so that they may be used from the top or side in obtaining measurements.

The inside measuring points 50 are so designed that the measuring surface on the points is on a direct line with the inside measuring surface of the nibs on the vernier or is spaced the distance of the width of the measuring nibs on the vernier from the edge 52 of the points, with this feature the points may be set or read directly on the inside vernier scale in measuring slots, depth of keyways, undercuts, etc. on inside surfaces. Both the points 44 and 50 are provided with seats 54 to receive the clamps 20 or 56 therein.

In Figure 4 the clamp 20 is provided with a set screw 22 and a protection shoe 21 which protects the measuring surface of the vernier nibs 18 from being marred or damaged by screw 22 being tightened to retain the points on the nibs 18.

In Figures 5 and 6 the clamp 56 is provided with an eccentric wheel 60 mounted on a screw shaft 58 which also acts as a lock screw to lock the wheel in tightened position, as movement of the screw tightens the clamp to lock the wheel in nib-clamping position and retain the points on the nibs 18.

Either clamp, shown in Figures 4 and 5, and described above may be used to attach any point or combination of points to the vernier nibs and any one type of the two, only, need be furnished with the complete set of points.

It is believed the foregoing description will fully explain the principles of the invention and it is to be understood that changes in the details of construction, arrangement and combination of parts may be resorted to provided they fall within the spirit of the invention and the scope of the appended claim.

Having thus described the invention, what is claimed as new and desired to be secured by Letters Patent is:

A device of the character described for use with a measuring instrument having measuring jaws, comprising a removable point adapted to be positioned within the plane of the inner surface of the jaws, a U-shaped clamp adapted to embrace a jaw and a point, a removable pin extending across the open end of the clamp having its inner end screw threadably engaged with one side of the clamp and an eccentric wheel rotatably mounted in the open end of the clamp on the pin for gripping engagement with the outer surface of the jaw.

JOHN J. KRISANDA.

REFERENCES CITED

The following references are of record in the file of this patent:

UNITED STATES PATENTS

| Number | Name | Date |
| --- | --- | --- |
| 758,283 | Shafer | Apr. 26, 1904 |
| 1,145,852 | Schramm | July 6, 1915 |
| 1,211,568 | Garrett | Jan. 9, 1917 |
| 1,650,704 | Gaa | Nov. 29, 1927 |
| 1,659,915 | Hilfiker | Feb. 21, 1928 |
| 2,304,265 | Magyari | Dec. 8, 1942 |
| 2,363,166 | Vierling | Nov. 21, 1944 |

FOREIGN PATENTS

| Number | Country | Date |
| --- | --- | --- |
| 111,749 | Great Britain | Dec. 13, 1917 |